United States Patent [19]

Rivat-Lahousse

[11] 3,885,009
[45] May 20, 1975

[54] METHOD AND APPARATUS FOR PRODUCTION OF STRATIFIED SHEETS AND ARTICLES OF EXPANDED THERMOPLASTIC MATERIALS

[75] Inventor: Andre Rivat-Lahousse, Paris, France

[73] Assignee: Certain-teed Products Corporation, Valley Forge, Pa.

[22] Filed: Jan. 14, 1969

[21] Appl. No.: 791,063

Related U.S. Application Data

[63] Continuation-in-part of Ser. No. 781,372, Dec. 5, 1968, abandoned.

[30] Foreign Application Priority Data

Dec. 6, 1967  France .......................... 67.131156
Jan. 15, 1968  France .......................... 68.135998

[52] U.S. Cl. ............... 264/45.4; 260/2.5 B; 264/51; 264/53; 264/54; 264/55; 18/4; 18/35; 156/246; 161/161; 264/46.3

[51] Int. Cl. ........................................... B29d 27/03

[58] Field of Search ............. 260/2.5 B; 264/46, 45, 264/47, 51, 53, 54, 55

[56] References Cited
UNITED STATES PATENTS

| | | | |
|---|---|---|---|
| 2,865,800 | 12/1958 | Stastny .............. | 260/2.5 B |
| 3,065,500 | 11/1962 | Berner ................ | 425/122 |
| 3,278,658 | 10/1966 | Immel ................. | 264/51 |
| 3,309,440 | 3/1967 | Kracht ................ | 264/138 |
| 3,383,441 | 5/1968 | Norrhede et al. ... | 264/51 |
| 3,417,170 | 12/1968 | Knapp ................ | 264/51 |

Primary Examiner—M. J. Welsh
Attorney, Agent, or Firm—Synnestvedt & Lechner

[57] ABSTRACT

Method and apparatus for the production by molding, of stratified blocks, plates, sheets and articles of special shape, of cohered thermoplastic granules of material such as polystyrene, by preheating the granules to a temperature at about their softening point, followed by their expansion during molding, by insufflation with steam. The invention comprehends forming the molded articles in cohered layers of which one, for example, an outer layer may be expanded granules of polystyrene of smaller granulometry and greater density, and another layer of coarser granules and lesser density. Or there may be a central layer of granules of larger size to opposite sides of which are cohered respective layers of expanded granules of smaller size and greater density than the central or inner layer. Thereby the outer layers impart strength and improved appearance while the central layer adds improved heat insulating qualities. The invention also contemplates making the several layers of different material. For example, one layer may be granules of polystyrene and another of granules of polysulfones. Where fire retarding qualities are desired, one or more layers may be a hydrocarbon or a phosphate of chlorine or bromine. The plates, sheets, etc., may be fabricated in corrugated, fluted, channeled or embossed forms.

7 Claims, 8 Drawing Figures

INVENTOR
Andre Rivat-Lahousse

BY Bauer & Seymour
ATTORNEYS

INVENTOR
Andre Rivat-Lahousse

BY Bauer & Seymour
ATTORNEYS

INVENTOR
Andre Rivat-Lahousse
BY Bauer & Seymour
ATTORNEYS

METHOD AND APPARATUS FOR PRODUCTION OF STRATIFIED SHEETS AND ARTICLES OF EXPANDED THERMOPLASTIC MATERIALS

In a prior copending application Ser. No. 781,372, filed Dec. 5, 1968, now abandoned, of which this application is a continuation-in-part, I have disclosed a method and apparatus for producing blocks, plates, sheets, and specially shaped articles, of thermoplastic granular materials such as polystyrene, having an expanding or blowing agent incorporated therein, and expanded during molding by insufflation with heated gas or steam. The aforesaid method comprises preheating the granules to a temperature at about their softening point, before introduction into the mold.

The present invention relates to a method and apparatus constituting an improvement over the disclosure of the aforesaid application.

It is a principal object of the invention to provide a method and apparatus by which blocks, sheets, panels and shaped articles may be formed of superposed layers or strata of expanded cohered thermoplastic material, the several layers being composed respectively, of granules or pearls of different characteristics such as density and/or granulometry.

Another object is to provide a method and apparatus wherein the granules forming the outer layer or layers of the panels may be finer or smaller, to afford exposed surfaces which are more dense than the central or inner layer. This in particular imparts to the panels or sheets, improved properties such as mechanical strength, good appearance, and excellent heat insulation.

Still another object is to provide a method and apparatus whereby there are produced sheets or panels of cohered stratified layers of respective materials which, while compatible, differ inter se in physical properties or characteristics. Thus, for example, a first layer may be of expanded polystyrene granules, and a second layer of expanded polysulfone granules adherent to the first layer.

Yet another object is to provide a method and apparatus by which sheets, panels and shaped articles may be produced with one or more layers of a fire-resitant or fire-retarding material such for example as hydrocarbon or phosphoric compounds of chlorine and/or bromine.

Another object is to provide an apparatus by which the panels or sheets may be formed with corrugations, channels, embossed and other surface formations.

Other objects and advantages will become clear to those skilled in the art, after a study of the following detailed description, in connection with the accompanying drawing.

Figure 1:
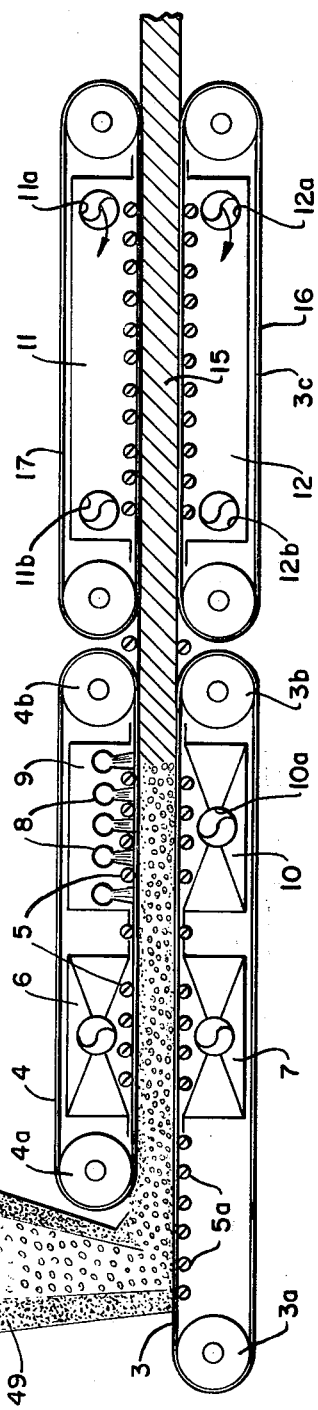
FIG. 1 is a schematic vertical longitudinal section through an apparatus embodying the invention, wherein the method is carried out in a continuous procedure.

Referring in detail to FIG. 1 there is shown apparatus comprising a hopper 49 divided by two partitions 49a, 49b arranged as shown, by which the hopper is divided into three discrete compartments, namely, center compartment 50 and compartments 51, 52 at respective sides thereof. It will be understood that the three compartments terminate in parallel outlets or slots which extend in side-by-side relation transversely across the width at the delivery end of lower conveyor belt 3. By this construction three superposed layers of granular material, such as 51, 50 and 52 may be deposited simultaneously onto the belt. These materials may differ among themselves in apparent density, granulometry and other physical characteristics. The partitions 49a and 49b may each be movable for adjustment toward and from its adjacent wall of hopper 49 thereby to control and regulate the desired thicknesses of the outer layers of materials 51 and 52 with respect to the central or inner layer.

After having been deposited upon the leading or upstream end of the upper run of conveyor belt 3, the layers of material pass therewith to and beneath the lower run of belt 4. This belt passes about end rollers 4a, 4b, and its lower run is maintained essentially planar by guide or idler rollers 5 which extend transversely across the width of the belt. Likewise, belt 3 passes about end rollers 3a, 3b and its upper run is maintained essentially parallel, except as otherwise subsequently noted, to the lower run of belt 4, by guide or idler rollers 5a.

The belts 3 and 4 may be of sheet steel pierced with a multiplicity of apertures over their effective areas. These apertures are closely spaced and small enough to prevent granular materials from passing therethrough but which conjointly permit the free passage of air and steam through them.

During the first part of their passage between and with the parallel runs of belts 3, 4, the granules are preheated by a flow of air induced through them and the belts, from an upper housing 6 to lower housing 7. Each housing is closed except for a lower open side of housing 6 contiguous to the lower run of belt 4, and an upper open side of housing 7 contiguous to the upper run of belt 3.

After passing from between these housings 6 and 7, the material passes immediately to and between similar housings 9 and 10, upper and lower, and which as shown, are similarly constructed are arranged. A plurality of tubes 8 disposed in upper housing 9, have rows of holes facing the lower pass of belt 4 and operating to direct uniformly-distributed jets of saturated or superheated steam from a source not shown, through the belt, to insufflate the preheated layers of granules and to thus cause them to expand rapidly. Steam is exhausted from lower housing 10 by means such as blower 10a.

After passing from between the confronting runs of belts 3 and 4 the cohered granules pass to and between the contiguous parallel runs of conveyor belts 16 and 17, lower and upper, respectively, and between upper and lower housings 11 and 12 wherein the sheet is cooled by air emerging from blowers 11a and 12a, and which passes in heat exchange relation with and over the upper and lower surfaces of the sheet, thereby cooling it. As explained in my earlier filed application above identified, the contiguous runs of belts 16 and 17 may have a spacing less than that of the corresponding runs of belts 3 and 4, so that in passing between belts 16, 17, the material or sheet is given a compression in addition to that imparted to it by and between belts 3, 4, and the expansion effected by the steam.

Figure 2:
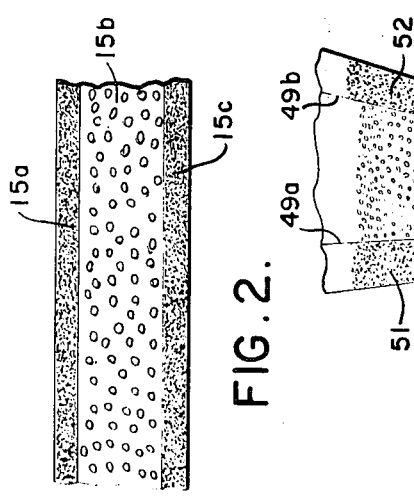
FIG. 2 is a section through a product produced by the apparatus of FIG. 1.

FIG. 2 shows in section the resulting product consisting of outer layers or strata of expanded cohered granules 15a, 15c, of apparent density greater than that of central layer 15b. Thus the outer layers provide strength and smooth impervious surfaces while the inner layer affords added heat and sound insulating properties.

Figure 3:
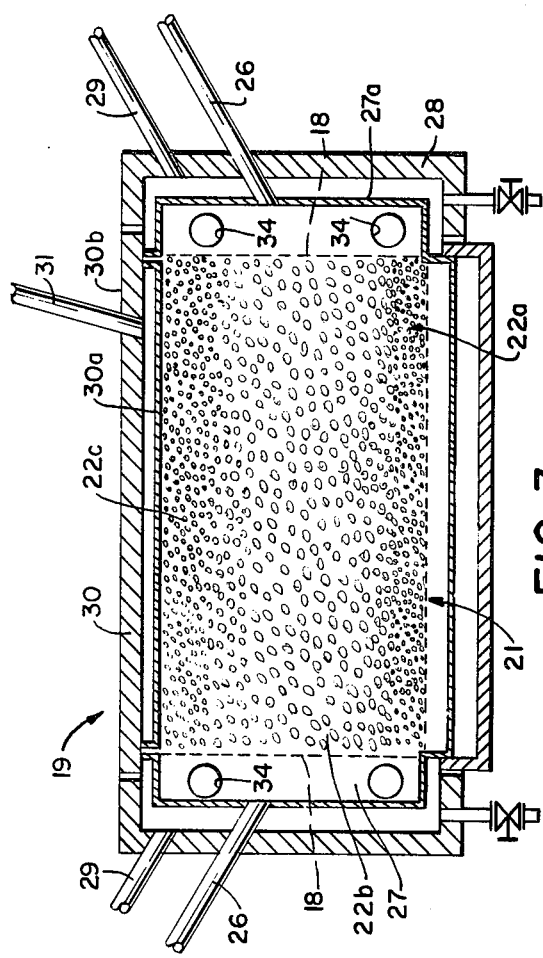
FIG. 3 is a vertical section through a jacketed mold by which the invention is performed in a discontinuous procedure.

FIG. 3 shows a mold generally identified at 19, and operable to produce in a discontinuous procedure, blocks, plates, sheets and specially shaped articles. The materials are deposited in succession through the normally-open top of the mold, onto the foraminous bottom wall 21. There may be three layers of granules, such as a lower one 22a, intermediate layer 22b and upper layer 22c. As in FIG. 1, layers 22a and 22c may be material differing from that of intermediate layer 22b, in granular size, apparent density, and/or physical characteristics. For example, layers 22a and 22c may consist of granules having a range of smaller sizes than those of the central or intermediate layer 22b, so that in the final product the surfaces of the sheet are more dense than the central layer or stratum.

The mold includes foraminous side and bottom walls 18, 21, respectively. Jacket walls 27a surround walls 18 and form a chamber 27 into which steam may be introduced through pipes 26. Outer walls 28 of heat insulating material surround walls 27a in spaced relation therewith and form a second chamber which enables preheating and temperature control by steam or heated air introduced through pipes 29.

The otherwise open top of the mold may be closed by a cover or lid 30 comprising inner and outer spaced walls 30a, 30b defining between them a chamber into which steam may be introduced through pipe 31. Preheating of the granular material deposited into the mold may be effected by the introduction of heated air into and its exhaust from the mold, through conduits 34. These conduits also enable the introduction into chamber 27, of cool air to speed up cooling of the article after molding has been completed.

Molding is effected as aforesaid by the introduction of steam under pressure through pipes 26, into chamber 27. The steam penetrates through the foraminous side and bottom walls 18 and 21 and effects the expansion, cohesion and molding of the granules. Cooling may be then expedited by the introduction through orifices 34, of cold air into chamber 27. There is thus produced a composite product having upper and lower layers or strata which are different from the central or intermediate layer.

Figure 4:
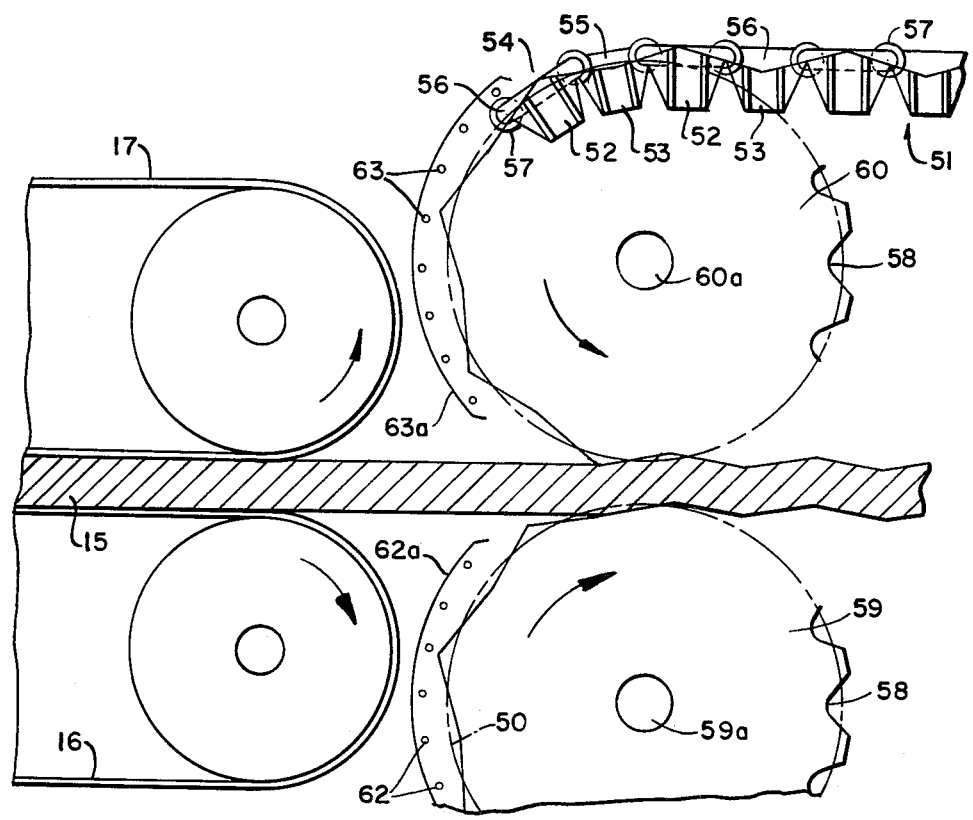
FIG. 4 is a view in vertical section of a portion of an apparatus where, in accordance with the invention, the ribbon, sheets, or panels are formed with transverse corrugations.

FIG. 4 shows a construction for shaping the ribbon or sheet 15, for example, of polystyrene. The sheet may be either homogeneous or composed of a plurality of strata as indicated at 15a, 15b, 15c, FIG. 2. The construction enables the formation in the sheet of embossments of various shapes and forms, such as transversely extending corrugations which may be either arcuate in longitudinal vertical section, or composed of angularly-related planar surfaces.

The device comprises lower and upper link belts 50, 51 each consisting of articulated sections or transverse bars as indicated at 52, 53 for belt 51, it being understood that the belts may be of duplicate construction. These sections or bars extend transversely across the width of the sheet or ribbon. Bars 52 are formed to present outwardly-facing transverse ridges as indicated at 54. Bars 53 are shaped to define transversely extending depressions or channels 55.

At its respective ends each of the aforesaid bars is fixed with a link such as 56, so that there are two such links for each bar. The links at the respective ends of the bars are articulated together at their meeting overlapping ends. The pivot pin passing through these overlapping ends of each pair of links carries an antifriction roller such as 57. Thus each belt has the same number of links as rollers. Each roller is sized and shaped to fit within spaces 58 between teeth formed on sprockets 59 and 60. There are two sprockets 60 fixed to the respective ends of a shaft 60a, and two sprockets 59 fixed to the respective ends of shaft 59a. The construction is such that the transversely-extending linear edges of each bar are essentially in line contact with the corresponding edges of the next adjacent bars at each side, so that the bars may pivot relatively about the respective axes defined by the articulation or pivotal connection between sequential bars, as they pass about sprockets 59, 60. It will be noted therefore that the radially outward surfaces of the bars of each belt conjointly form or define what is, in effect, a continuous planar surface which, nevertheless may conform to the curvature of the sprockets as the belts pass thereabout.

The two link belts 50, 51 are power driven at the same linear speed and the arrangement is such that each ridged bar 52 of belt 51 is aligned in a vertical plane through the axes of shafts 59a, 60a, with a channeled bar 53 of belt 50, at the instant that each such pair of bars passes through the plane. Since the bars of the upper and lower belts are thus rigidly held in the spaced relation shown as they pass through the plane aforesaid and in their sequential parallel and adjacent runs, they impart to the sheet or ribbon, transversely extending corrugations as shown. Of course, the linear speed of these belts is coordinated with the linear speed of the ribbon coming from between belts 16, 17, so that there is no attenuation or compression of the ribbon otherwise caused by the formation of the corrugations therein.

At 62 and 63 are indicated infra-red heating elements, and arcuate reflectors 62a and 63a, by which the articulated belts and their bars may be periodically reheated. It will be understood that these heating elements and their reflectors are fixed in the positions shown.

The bars may have their outer or effective surfaces so shaped as to define any geometrical or irregular co-operating forms, to impart corresponding shaped embossments or corrugations in ribbon 15. For example the effective surfaces of the bars may be alternating concave and convex so that each pair of coacting bars of the upper and lower belts form arcuate or sinuous corrugations in the ribbon. Similarly the bars may be formed with other embossed shaped to correspondingly emboss or shape the sheet 15. For example, in the packaging of articles such as fruits or eggs these embossments in the sheet will be so shaped that each receives, fits about and holds a respective one of the articles.

At the same time that the ribbon is thus shaped it may also be given an additional compression by the bars 52, 53, so that its thickness is decreased and its density increased. The bars may be so shaped that they compress the sheet along its edges to a greater extent than over its central areas, for example. In this way there is obtained a reinforcement or strengthening of the margins or borders of the sheet. These may be later cut off so that the formed sheets may be compactly stacked.

The increased density at certain areas of the sheet or ribbon as just discussed is of broad general utility in the production of a wide variety of shapes and articles. It enables such articles to be given a suitable or desired rigidity or stiffness with the use of a minimum quantity of material.

Figure 5:
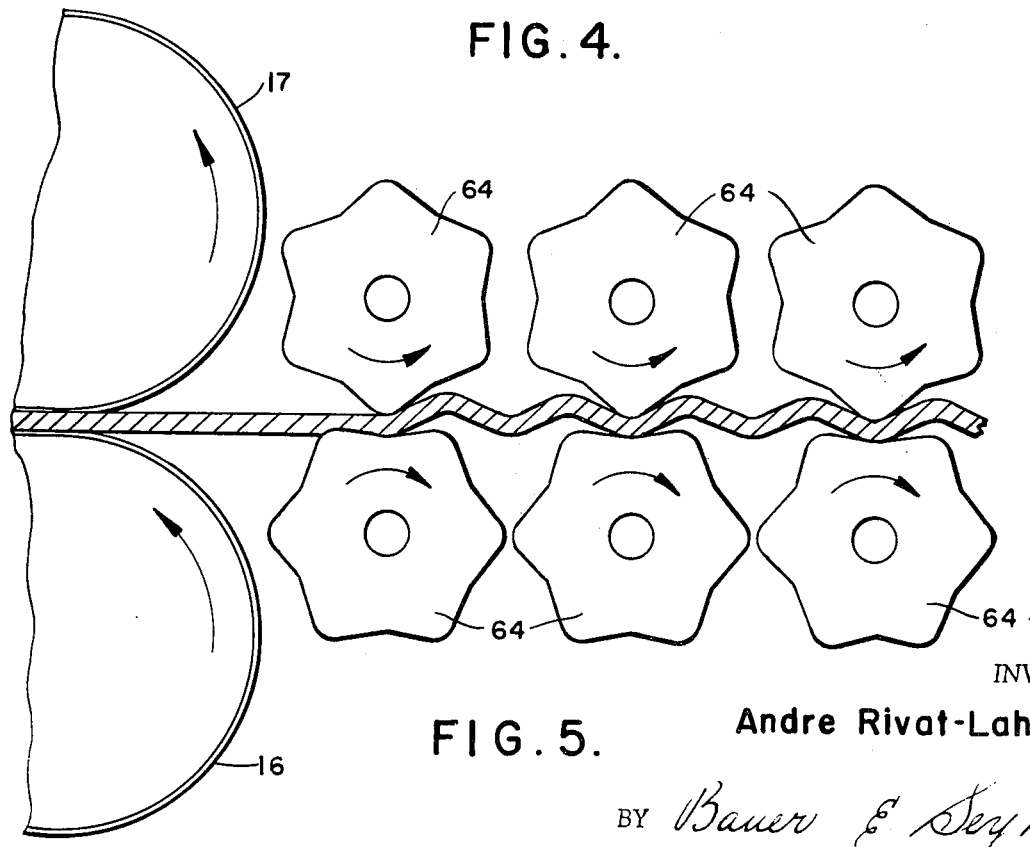
FIG. 5 is a view corresponding generally to FIG. 4 but showing means at the outlet or delivery end of the apparatus, for forming in the ribbon, sheets or panels, corrugations of a different shape.

At FIG. 5 there is shown mechanism which in a way obvious from inspection, effects the formation of transverse corrugations in the ribbon 15. As the ribbon emerges from between belts 16 and 17, it passes to and between pairs of upper and lower rollers 64 having surfaces which, as shown, are longitudinally corrugated and which are interconnected for positive rotation at the same angular speed so that each ridge on an upper roller, for example, mates with a depression between ridges in a lower roller, at the instant the mating parts pass through a plane determined by the parallel axes of the two rollers. The number of pairs of these rollers, shown as three, may be varied within practicable limits. The effective speed of rotation will, of course be coordinated with the linear speed of the ribbon as it emerges from between belts 16, 17, so that the corrugated portion is neither tensioned nor compressed.

Figure 6:
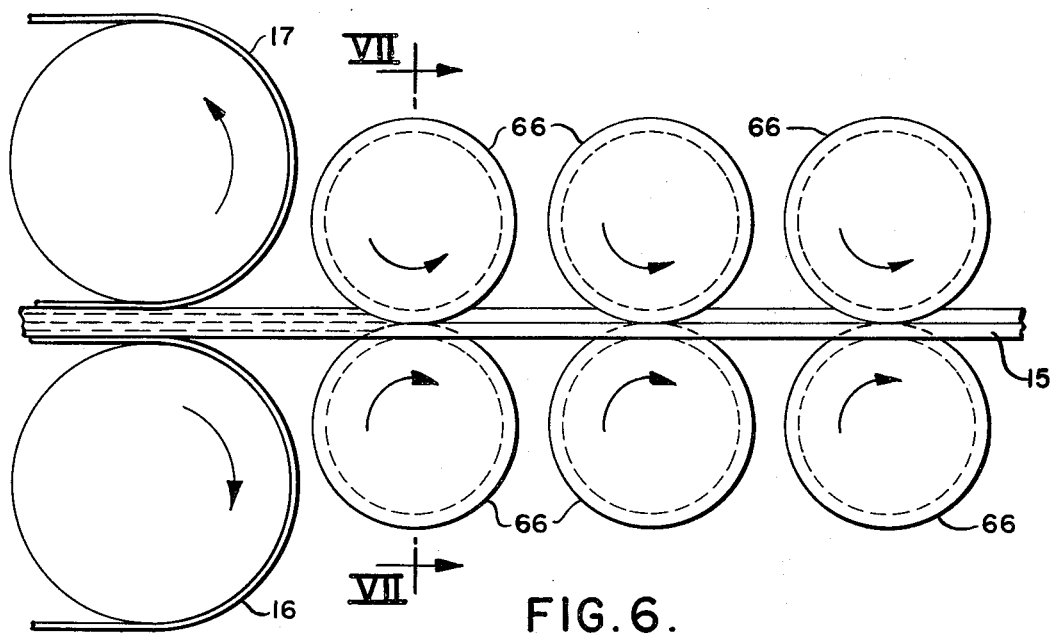
FIG. 6 is a vertical section of apparatus for shaping the ribbon with longitudinally extending corrugations or undulations.
Figure 7:
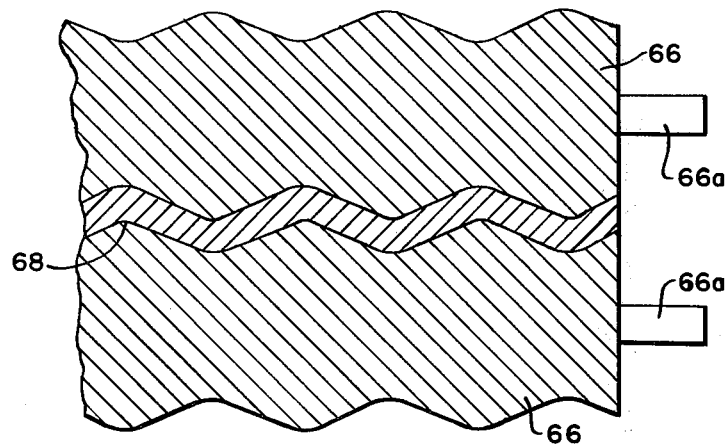
FIG. 7 is a section to an enlarged scale, taken in a plane identified by line VII — VII, FIG. 6.

FIGS. 6 and 7 show a train of superposed pairs of upper and lower rollers 66 each journaled on shafts 66a extending from its respective ends. These rollers are shaped as clearly shown to an enlarged scale upon FIG. 7, so that as they rotate in unison, they form longitudinally extending corrugations 68 in ribbon 15 as the latter emerges from between the contiguous runs of belts 16, 17.

In another modification for the formation in the sheets, of longitudinally-extending grooves or corrugations, one or both belts may be provided with one or several bands of resilient material such as rubber. These bands will have a thickness corresponding to that of the impression it is desired to form in the sheets. The bands may extend in laterally spaced planes normal to the axes of rotation of the guiding rollers for the belts, and each upper and lower pair of bands will be coplanar when it is desired to form beading or fluting in the sheet. On the other hand when corrugations are to be formed, each band aforesaid, of one belt will be laterally offset to lie in a plane between the planes of a contiguous pair of bands on the other belt.

Figure 8:
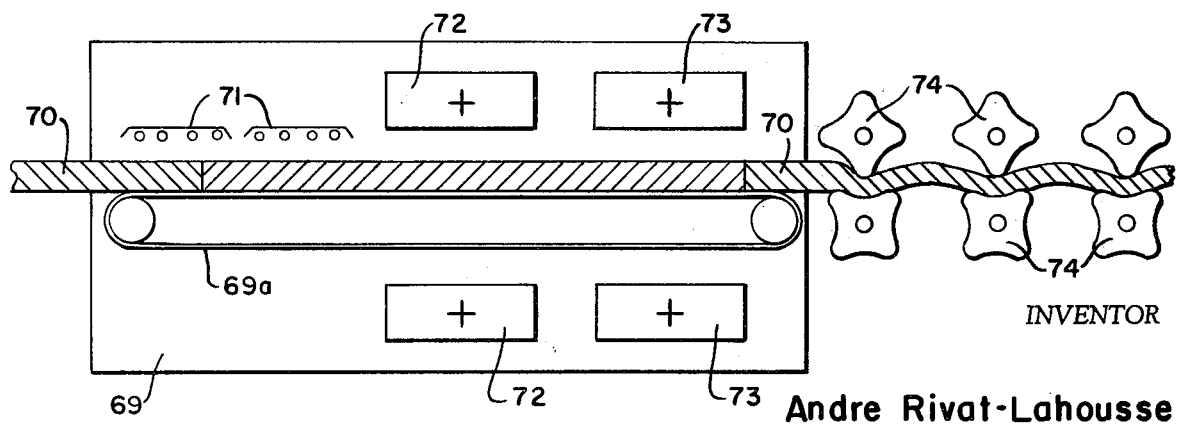
FIG. 8 is a schematic view partly in section of apparatus wherein the ribbon or panels may be reheated prior to being conformed to the final desired shape.

After formation of the sheets as previously described, it may be desirable to reheat them before forming corrugations or other shapes therein. FIG. 8 shows a device for this purpose. This device comprises a housing 69 equipped with a conveyor 69a operable to successively transport sheets 70 through it. The sheets may be of expansible resin. They are reheated by infrared heater means 71 and/or by hot air or gas heaters 72, 73. After the reheated sheets pass from housing 69 they travel between rollers 74 which, in the way previously explained, may be shaped and related to form transverse or longitudinal corrugations, or other shapes and forms, in the reheated sheets.

It is contemplated to introduce into certain layers of the material, waste material or detritus derived from sheets which have been previously fabricated.

Having fully disclosed the invention, what I claim and desire to secure by Letters Patent is:

1. The method of forming blocks, sheets and specially shaped articles from granular thermoplastic material containing a blowing agent, comprising, depositing discrete superposed layers of granules into a mold, preheating the granules to about their softening temperature without agglomerating them, and subsequently insufflating the preheated granules with steam to effect their expansion and cohesion into a unitary article, while confined in the mold.

2. The method of claim 1, at least one said layer being composed of granules having a range of sizes different from the range of sizes of the granules of at least one other of said layers.

3. The method of claim 2, there being three discrete layers, the outer ones of said layers being composed of granules having a range of sizes smaller than the range of sizes of the intermediate or central one of said layers.

4. The method of claim 1, at least one said layer having a chemical composition different from but compatible with the remaining layer or layers.

5. The method of claim 4, one said layer being polystyrene, another of said layers being a polysulfone.

6. The method of claim 1, and including the step of compressing the preheated and insufflated layers after the expansion step to compact and cohere them into sheet form.

7. The method of claim 6, and including the step of shaping the sheet to impress the same with corrugations after the compression step.

* * * * *